United States Patent [19]

Hill

[11] Patent Number: 5,801,471

[45] Date of Patent: Sep. 1, 1998

[54] MULTIPHASE ELECTRIC MACHINE WITH A WINDING MADE OF FLAT-SHAPED STRUCTURAL CONDUCTOR PARTS

[76] Inventor: Wolfgang Hill, Ortenbergstrasse 3, D-76135 Karlsruhe, Germany

[21] Appl. No.: 574,297

[22] Filed: Dec. 18, 1995

Related U.S. Application Data

[63] Continuation of PCT/DE94/00724, Jun. 23, 1994, published as WO95/00997, Jan. 5, 1995.

[30] Foreign Application Priority Data

Jun. 26, 1993 [DE] Germany ............... 43 21 236.0

[51] Int. Cl.⁶ ...................... H02K 1/00; H02K 3/28
[52] U.S. Cl. ..................... 310/179; 310/182; 310/201
[58] Field of Search ........................ 310/179, 182, 310/201, 42, 216

[56] References Cited

U.S. PATENT DOCUMENTS

| 693,579 | 2/1902 | Wait | 310/201 |
|---|---|---|---|
| 1,775,634 | 9/1930 | Apple | 310/201 |
| 1,789,128 | 1/1931 | Apple | 310/201 |
| 1,789,129 | 1/1931 | Apple | 310/201 |
| 4,028,572 | 6/1977 | Baltisberger | 310/201 |
| 4,403,163 | 9/1983 | Armerding et al. | 310/213 |
| 5,331,244 | 7/1994 | Rabe | 310/180 |

FOREIGN PATENT DOCUMENTS

| 4125044 | 4/1993 | Germany . |
|---|---|---|
| 745302 | 4/1953 | United Kingdom . |
| 1281691 | 7/1972 | United Kingdom . |
| 1329205 | 9/1973 | United Kingdom . |

*Primary Examiner*—Thomas M. Dougherty
*Assistant Examiner*—Tran N. Nguyen

[57] ABSTRACT

Known bar windings and pulled coils are made of bent bar conductors with a constant cross section and thus insufficiently use the space available in the winding overhang. In addition, because of the bending radii to be respected, in particular in high-pole machines, long connection sections are obtained in relation to the pitch value, so that weight losses are increased. The disclosed shaped conductors are produced without bending radii in a single piece according to their final shape. Their cross section varies in the winding overhangs, so that the space available is utilized to a high extent and short connection sections are produced. Successive shaped conductors are arranged in different layers, so that interlaced multiphase double layers are produced. The length of a conductor lane formed by shaped conductors connected in series is independent from the depth of the grooves and all phase conductors of an interlaced double layer have the same design. Enlarged connection sites accessible at all times to all front faces of the winding overhangs are obtained by shaped conductors with asymmetric ends assembled in pairs before mounting. Motors and generators equipped with said shaped conductors are characterized by high efficiency and power densities.

17 Claims, 4 Drawing Sheets

MULTIPHASE ELECTRIC MACHINE WITH A WINDING MADE OF FLAT-SHAPED STRUCTURAL CONDUCTOR PARTS

This is a continuation of International Application PCT/DE94/00724, with an international filing date of Jun. 23, 1994, published as WO95/00997, Jan. 5, 1995, now abandoned.

BACKGROUND OF THE INVENTION

1. Field of the Invention

The invention concerns a multiphase electric machine with a winding whose conductor lanes are running in parallel layers towards the air gap and which are assembled from conductor parts without bending radii, said conductor lanes being partially arranged in the grooves of a soft magnetic body and running in the winding overhangs simultaneously in the direction of the groove length and the groove width, and where in said winding each conductor lane changes the layer with each pass through the winding overhang and connection of two successive conductor parts is made when changing the layer; as well as a process to manufacture such a machine.

2. Description of the Prior Art

In multiphase electric machines, good utilization of space in the winding overhangs by means of short lengths of conductors and large conductor cross sections creates advantageous prerequisites for the increase of power density and efficiency.

Although it is possible to achieve a high utilization of space in the groove area by means of profiled conductors, bars, and pulled coils, the available space in the winding overhangs, however, is only insufficiently utilized for current conduction and, because of the bending radii which have to be considered, the connecting paths are relatively large, particularly if the spacing is small.

In JP-63-287338, an air core bell type winding is described in which conductor parts are tangentially stacked in a device. By this, the interlacing of all conductor parts of a layer in one step is facilitated, while during said interlacing the ends of the conductors in the two winding overhangs are deformed in different directions. Two layers which have been deformed in different directions are subsequently inserted into each other in axial direction and the previously compacted ends of the conductors are connected with each other on the face side. Interlacing without damaging the insulation is possible only for small conductor cross sections, and axial insertion can be accomplished only, if no soft magnetic teeth are present.

In DE-OS 41 11 626 A1, a bar winding is described in which bending radii are avoided by inserting disk-shaped connecting conductors. However, the connecting paths in the winding overhangs are here dependent on the groove depth. For this reason, this structural design is advantageous only for annular radial air gap machines with shallow groove depth.

From GB 13 29 205, conductor parts for linear machines are known which are manufactured without bending radii by producing the entire conductor layer in a mold as a cast part. A prefabricated conductor part covers numerous pole pitches and all bars have the same distance to the air gap. Since the conductor parts are manufactured independently and then inserted into each other, expensive molds for prefabrication with small tolerances are required. Further, the height of the conductor is drastically reduced at the end of the groove resulting in a very small critical cross section. In the winding overhangs, conductor parts of all phases lie stacked on top of each other resulting in large voids in that area which are supposed to contribute to cooling.

Further, from DE-OS 41 25 044 A1, winding layers for a disk armature are known in which the conductor cross section in the winding overhang is decreased axially and increased tangentially. All conductor lanes of a multiphase winding layer are of a unique structural design. Therefore, each layer necessitates a number of conductor designs in accordance with the number of phases which, because of the size and complexity of the conductor parts, results in high manufacturing costs. This structural design can not be utilized in radial air gap machines.

This invention is, therefore, based on the objective to advance the development of a multiphase electric machine with overlapping conductor lanes in such a manner that short connecting paths and good utilization of space in the winding overhangs are achieved with the least possible manufacturing cost.

SUMMARY OF THE INVENTION

In accordance with the invention, this objective is achieved by the elements of claims 1 and 14. The inclined progression of the broadened ends of the structural conductor parts allows the joint bridging of the spacing of two connected, prefabricated structural conductor parts without bending radii, said spacing being of preferably one pole pitch. Conductor lanes of different phases are led past each other within an interlaced double layer which lies parallel to the air gap, without significantly decreasing the conductor cross section as compared to the cross section in the grooves, by arranging successive structural conductor parts in different layers of this double layer. Consequently, with each pass through the winding overhang, the progression of the conductor lane changes at the joints its distance in direction to the air gap surface of the soft magnetic body, while alternating the directional change within a double layer. A reduction of the conductor cross section is avoided by increasing the conductor cross section in direction to the groove width immediately at the passage from the groove into the winding overhang, said increase being subsequently largely compensated by the inclined progression. At the joints also which are all located on the face side of the winding overhang and are, therefore, accessible at any time, a reduction of the conductor cross section for the current is avoided by slightly elongating the end regions of the structural conductor parts in direction to the grooves. In order to provide larger melt-on zones on the joints to be realized in the assembly of the interlaced double layer, the structural conductor parts are prefabricated with preferably asymmetrical ends, the narrow ends are joined into V-shaped parts in a separate production step prior to application of the insulating layer, and, if necessary, are adjusted after production.

The number of the required different structural conductor parts is independent of the number of phases. For machines with a plane air gap only three different structural conductor parts are necessary which, because of their simple shape and small outer dimensions, can be produced without bending radii simply by, e.g. stamping or laser cutting from sheet metal. Besides the matching structural conductor parts only one additional structural conductor part for alternating the layers and one structural part for current supply and derivation at the beginning and the end of a conductor lane are required.

The structural conductor parts can also be inserted advantageously into radial air gap machines. In that case, however, for X layers (X+2) different structural conductor parts need to be prefabricated.

The soft magnetic body is preferably separated into segments which are subsequently inserted into the prefabricated winding in the direction of the groove depth.

Other advantageous embodiments can be gathered from the dependent claims.

The drawings present advantageous embodiments of the invention.

DETAILED DESCRIPTION OF THE PREFERRED EMBODIMENT

Figure 1:
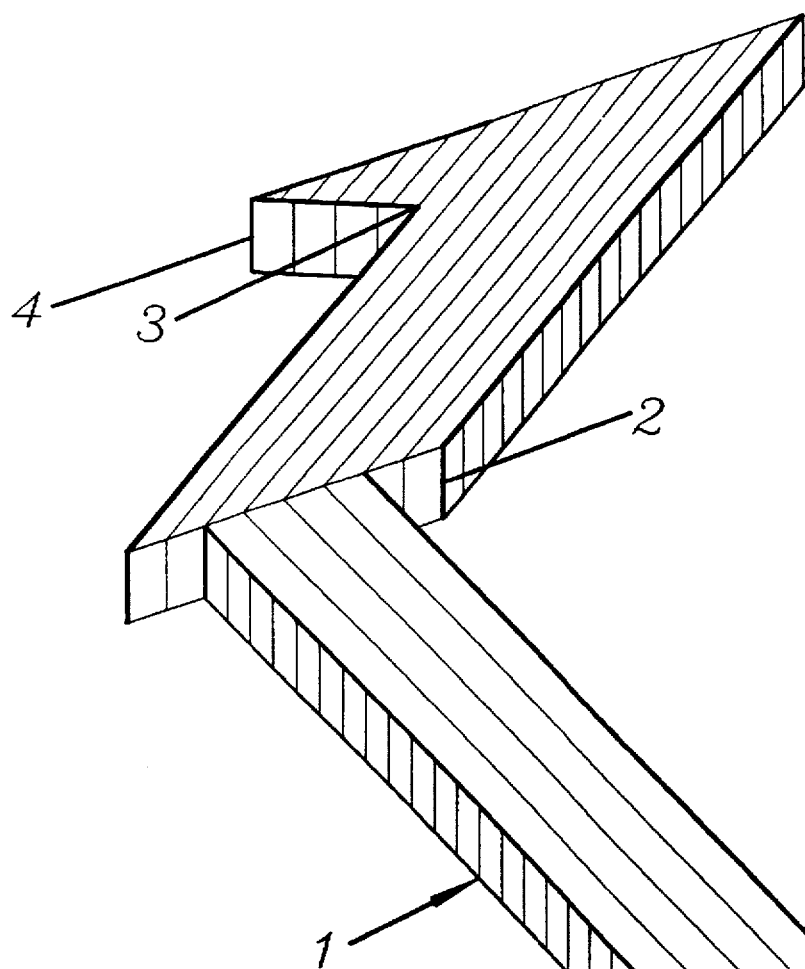
FIG. 1 shows the three-dimensional view of a structural conductor part with asymmetric ends for a linear motor.
Figure 1:
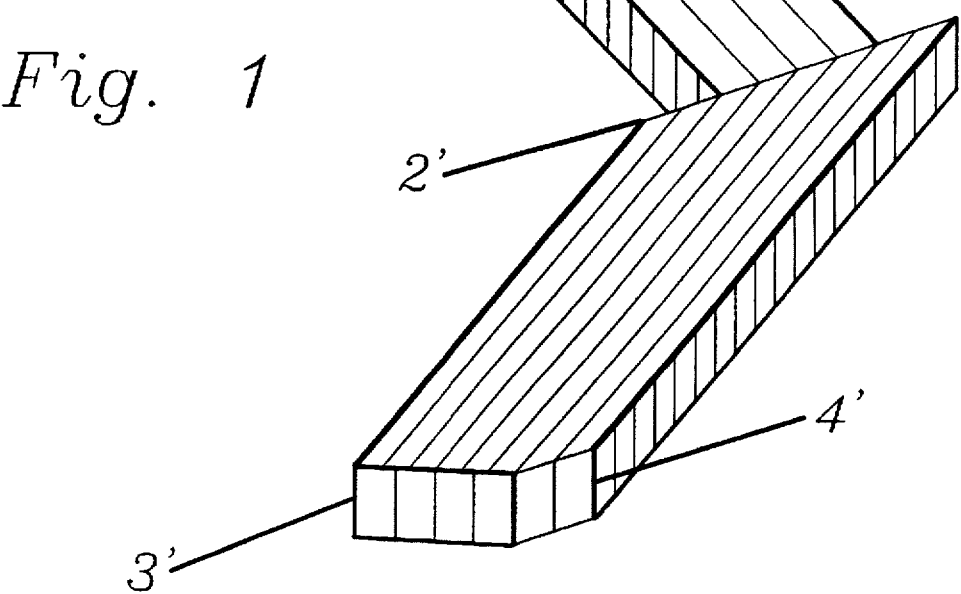

FIG. 1 shows a design in accordance with the invention of a structural conductor part (1) for a linear motor in which the rectangular cross section of the partial area in the center (2) to (2') occupies the entire width of the groove. Both ends (4) and (4') extend to the face side of the winding overhang, and partial areas in the winding overhangs (from (2) to (3) or respectively, from (2') to (3')) are running simultaneously in the direction of the groove length as well as the direction of the groove width. At the passage from the groove to the winding overhang (at (2) and (2')), the conductor cross section increases in the direction of the groove width on both sides by one half tooth width each. Because of the inclined progression, the effective width of the conductor for the current in region (2) to (3) and (2') to (3') is reduced again to approximately the width of the groove. In order to enlarge the contact surfaces, or the melt-on volume respectively, at the joints to the preceding or the succeeding structural conductor part, the partial areas at the ends (from (3) to (4), or respectively from (3') to (4')) are running—like the partial areas in the center—in the direction of the groove length. The shown design possesses asymmetrical ends, and in said design each second joint (at 4) in a conductor lane consisting of identical, serially switched structural conductor parts (1) is enlarged and the more narrow joints (at 4') are joined prior to assembly.

Figure 2:
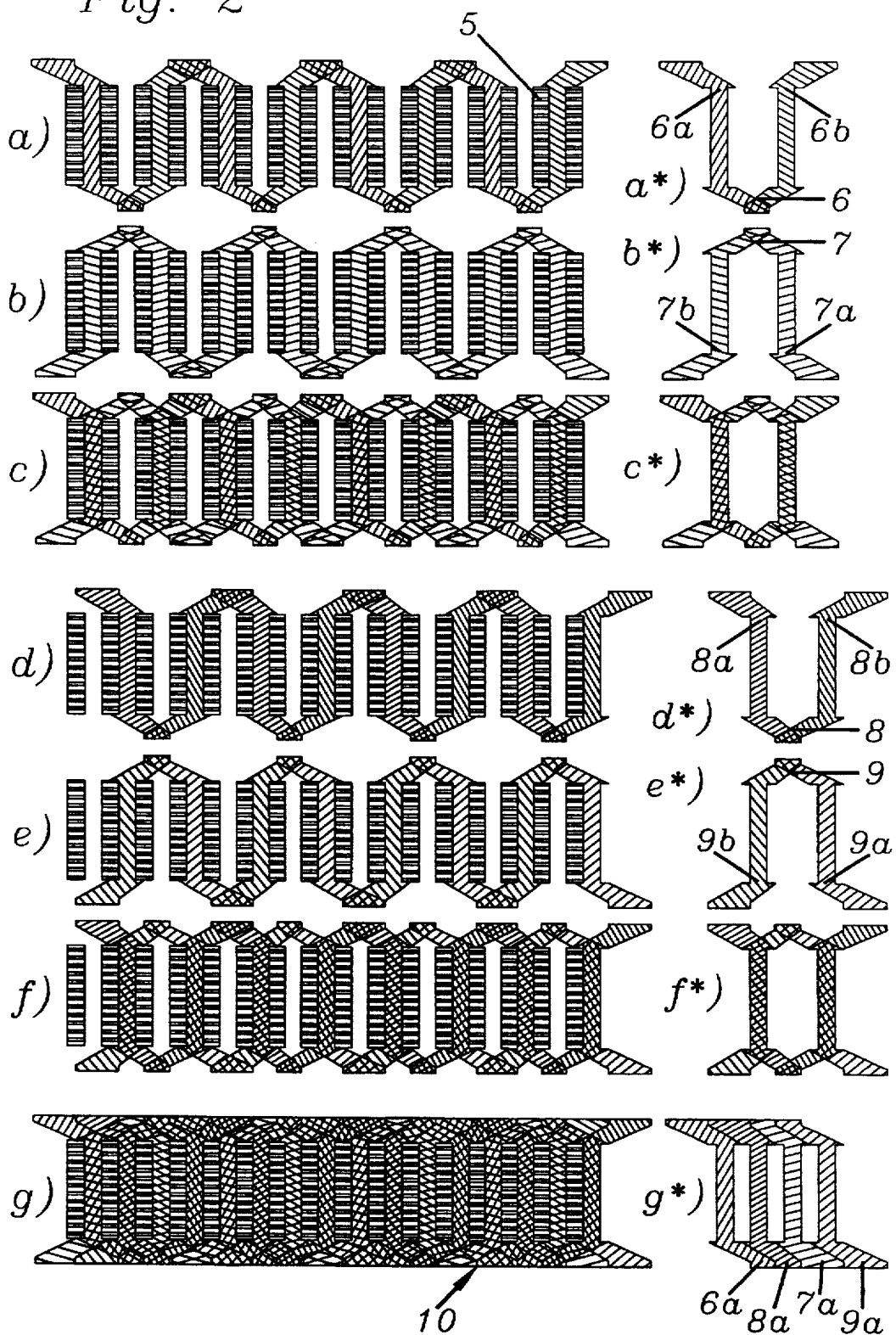
FIG. 2 shows the configuration of an interlaced double layer for a two-phase linear motor.

FIG. 2 shows the progression of the conductor lane in an interlaced double layer of a two-phase linear motor with grooved soft magnetic body (5) of which only the teeth are visible. The conductor parts possess asymmetrical ends, and in the shown design, layer joints of narrow ends and of wide ends alternate in the winding overhang in the direction of movement. This makes it possible that in joining of the interlaced double layer a number of structural conductor parts of a layer, said number corresponding to the number of phases, can be inserted as a group, which simplifies assembly of the winding. A two-phase double layer consists of four conductor lanes which are individually illustrated in FIGS. 2a, 2b, 2c, and 2d. In the viewed section, each of these conductor lanes consists of identical V-parts (6), (7), (8), (9), which in turn are prefabricated of two structural conductor parts or as a single unit. Structural conductor parts (6a), (7a), (8a), (9a) which belong to the upper layer are hatched from bottom left to top right, and the structural conductor parts (6b), (7b), (8b), (9b) of the lower layer are hatched from bottom right to top left. In FIG. 2c, the two interlaced conductor lanes of the first phase are shown, and in FIG. 2f the symmetrically complementing conductor lanes of the second phase. The conductor lanes, or the V-parts respectively, of a phase are identical. On the right side of the page the V-parts (6) to (9) are shown individually, and respectively, complementing each other. FIG. 2g shows how all four conductor lanes together form an interlaced double layer (10), and where the double layer possesses two plane surfaces in the direction of the groove depth, the distance of said double layer corresponding in each location to twice the height of the conductor in the grooves.

Such compact windings can be easily produced for any number of phases as well as for radial and axial air gap machines by joining structural conductor parts of stacked layers.

Figure 3:
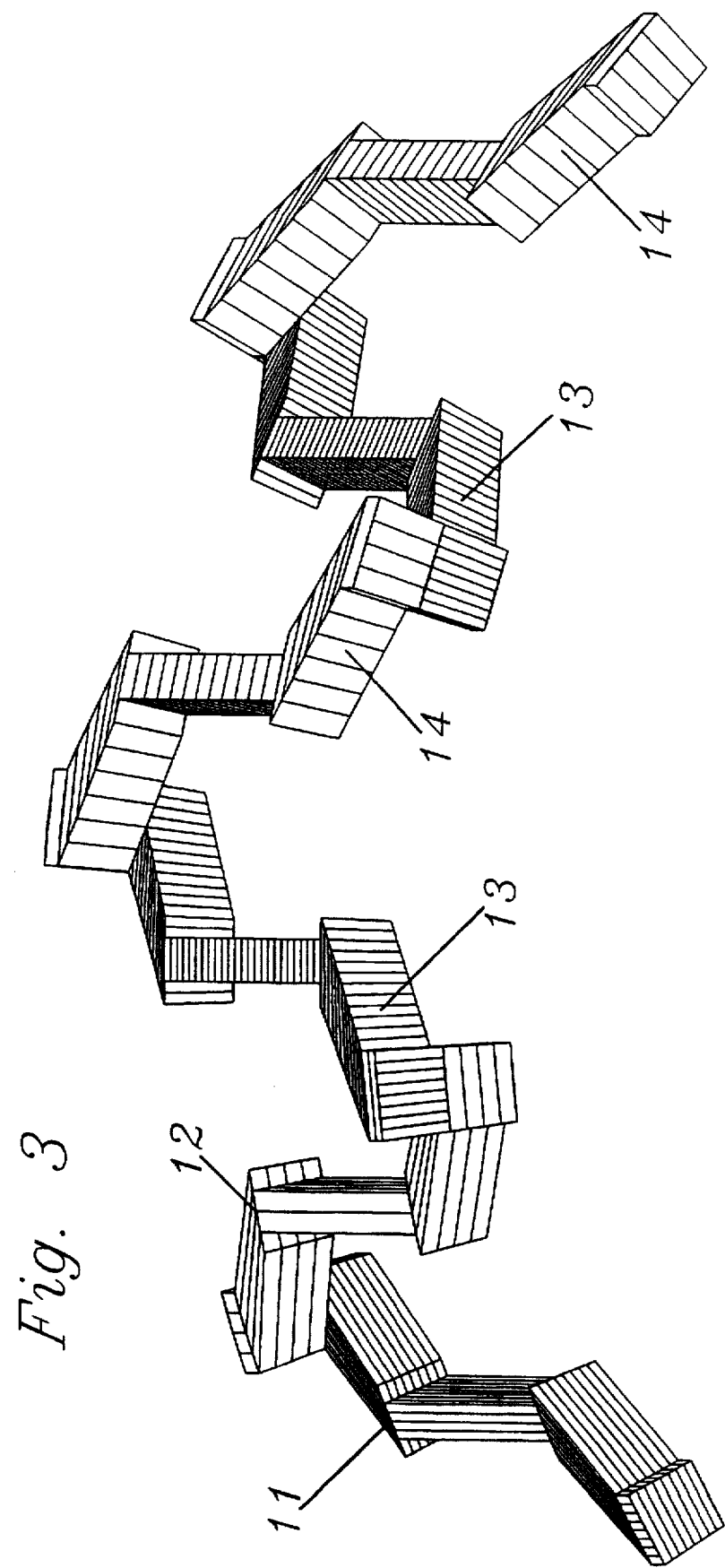
FIG. 3 shows a section of a conductor lane of a radial air gap machine at the passage between two double layers.

FIG. 3 shows the change of a conductor lane between two interlaced double layers from a radial air gap machine. Here, the two last structural conductor parts (11) and (12) of the double layer lying radially toward the inside are shown on the left and on the right are the four first structural conductor parts (13) and (14) of the double layer that follows toward the outside in radial direction. Since in a radial air gap machine the spacing increases with an increasing radius, each layer possesses its own conductor design which is further clarified by different hatching. The tangential direction of current is retained at the change between the double layers. Each phase consists, therefore, of two conductor lanes of which the conductor lane shown runs clockwise toward the outside and the complementing conductor lane runs counterclockwise toward the inside. Depending on the desired voltage-current ratio, the two conductor lanes can be switched in series or parallel. Particularly in low voltage machines, the change of layers between two successive V-parts can always occur in the same direction in which case no interlaced double layers ensue. Instead, the entire winding is interlaced and many conductor lanes can be switched parallel. Since the welding, or respectively the soldering together on the face sides is executed after the assembly of the entire winding, manufacturing expenditures are changed only insignificantly by different switching variants.

Change of the double layer with constant direction of rotation is possible only in rotating machines in which the double layers occupy the entire circumference. In linear motors and in machines consisting of sectors, change of the double layer occurs within special alternating structural conductor parts simultaneously with the reversal of flow of the current in the direction of the groove width.

Figure 4:
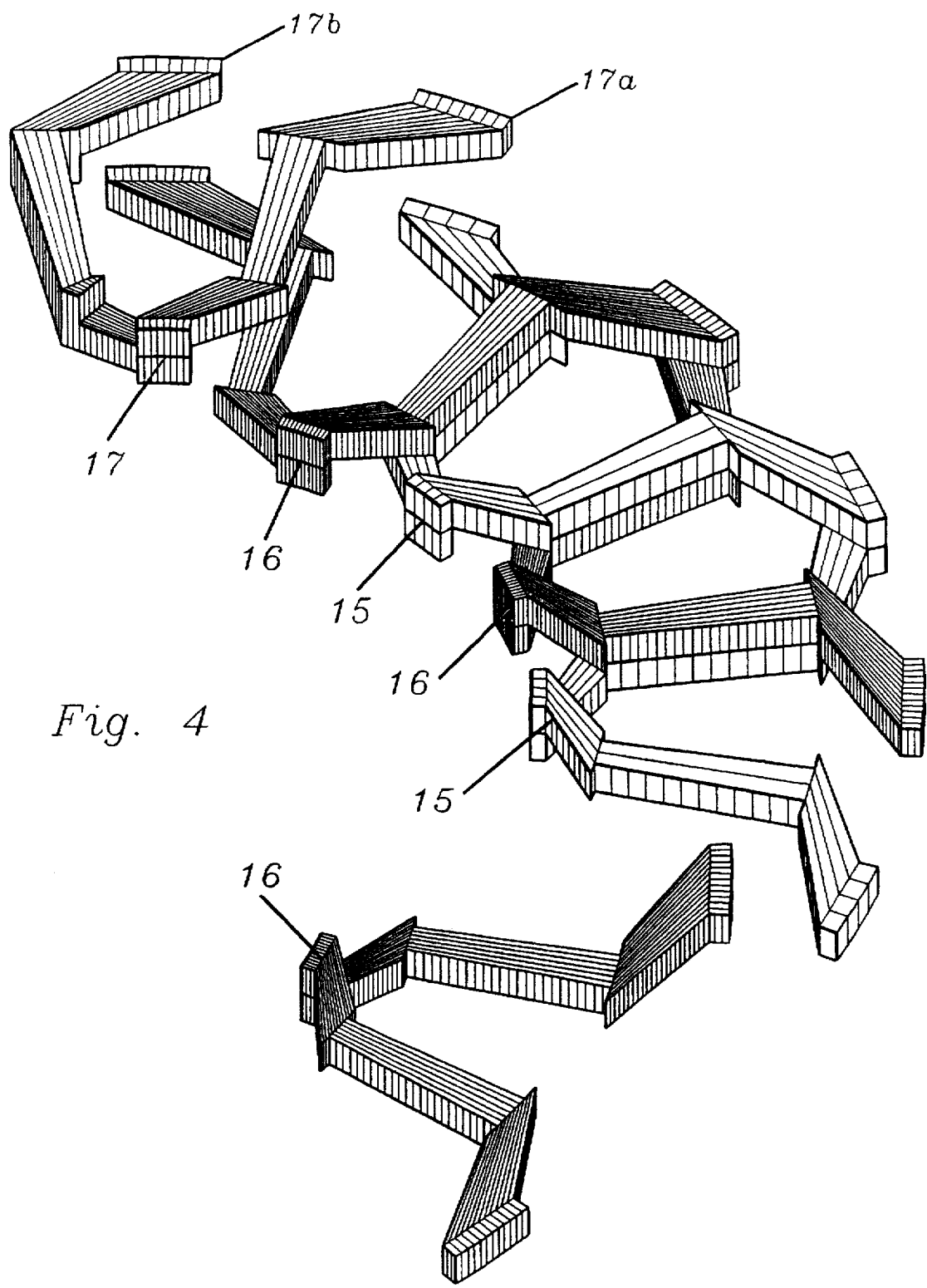
FIG. 4 shows a section of a conductor lane of an axial air gap machine with an alternating structural conductor part.

FIG. 4 shows a conductor lane of an axial air gap machine which is divided into sectors, the alternating structural conductor part (17) of said conductor lane connecting the two conductor lanes of a phase within a double layer. The two conductor lanes of a phase conductor which is shown as a sectional cutout consists of identical V-parts (15) and (16) which, in turn, are prefabricated from identical structural conductor parts. One half of the alternating structural conductor part (17) consists of one of these structural conductor parts (17a) as well, while the second half (17b) possesses ends in different layers, said ends having identical tangential components. The height of the conductor in the central part of the piece is twice that of the remaining structural conductor parts, and, depending on the configuration of the edge groove, the width of the conductor can be variously executed. An alternating structural conductor part between two double layers possesses only at one end contact surfaces on the outside instead of on the inside.

What is claimed is:

1. A multi-phase electric machine comprising at least one stator and at least one moving part and having an air gap between the stator and the moving part of said machine and at least one winding with a face side the conductor lanes of said winding are running in layers parallel to said air gap and are assembled from structural conductor parts without bending radii, said conductor lanes being partially arranged in grooves of a soft magnetic body, said grooves consisting of a width, a height, and a depth, and said conductor lanes running in winding overhangs simultaneously parallel to the groove length and to the groove width, and where in said winding each conductor lane changes the layer with each pass through the winding overhang and two successive said structural conductor parts are connected when changing the layer.

2. A multiphase electric machine as recited in claim 1 wherein the structural conductor parts possess two parallel surfaces which lie parallel to the air gap surface of the soft magnetic body.

3. A multiphase electric machine as recited in claim 1 wherein the structural conductor parts have a conductor cross section and said conductor cross section is enlarged parallel to the groove width at the passage from the groove to the winding overhang.

4. A multiphase electric machine as recited in claim 1 wherein the structural conductor parts at both ends extend parallel to the groove length to the said face side of the winding overhangs.

5. A multiphase electric machine as recited in claim 1 wherein the structural conductor parts are elongated on both ends in direction of the groove length.

6. A multiphase electric machine as recited in claim 1 wherein the structural conductor parts possess on both ends different dimensions in direction to the groove lengths.

7. A multiphase electric machine as recited in claim 1 wherein the conductor lanes, except for their ends at the layers, are assembled of identical structural conductor parts whose lengths in the direction of the groove width corresponds approximately to one pole pitch.

8. A multiphase electric machine as recited in claim 1 wherein two successive structural conductor parts form prefabricated V-parts.

9. A multiphase electric machine as recited in claim 1 wherein two successive structural conductor parts form a prefabricated V-part said V-part having two ends and a center part and said ends are larger parallel to the groove width than the center part of said V-part in which the change of layer takes place.

10. A multiphase electric machine as recited in claim 1 wherein two conductor lanes each of each phase are running alternately above and below each other in successive grooves.

11. A multiphase electric machine as recited in claim 1 wherein all interlaced conductor lanes of all phases together form one multiphase interlaced double layer, said multiphase interlaced double layer has a height A and the structural conductor parts have a height B, said height A of said multiphase interlaced double layer parallel to the groove depth corresponding to twice the height B of the structural conductor parts inserted into the grooves.

12. A multiphase electric machine as recited in claim 1 wherein the structural conductor parts at the ends of a double layer possess the same outer dimensions as the remaining structural conductor parts in their layer, however, their contact surfaces in direction to the groove depth are arranged on different sides.

13. A multiphase electric machine as recited in claim 1 wherein in linear machines and in machines consisting of sectors alternating structural conductor parts are built into the ends of a double layer, the ends of said alternating structural conductor parts are running in direction of the groove width on the same side.

14. A multiphase electric machine comprising at least one stator and at least one moving part and having an air gap between the stator and the moving part of the machine and at least one winding whose conductor lanes consist of prefabricated structural conductor parts which have a rectangular cross section and two plane surfaces opposite to each other and which are prefabricated without bending radii, said prefabricated structural conductor parts being partially arranged in grooves of a soft magnetic body, said conductor lanes running outside the soft magnetic body in the winding overhangs and changing layers when passing through a winding overhang and said structural conductor parts having two ends which are located outside the soft magnetic body and which are in contact with consecutive conductor parts.

15. A multiphase electric machine as recited in claim 14 wherein said multiphase electric machine has two winding overhangs outside the soft magnetic body, said ends of structural conductor parts which are in contact with a consecutive conductor part are part of the surface of the winding overhang which has the greatest distance to the soft magnetic body and the consecutive conductor part has a different distance to the air gap which lies between the stator and the moving part and in which a magnetic flux flows from the stator to the moving part of the machine.

16. A multiphase electric machine as recited in claim 14 wherein two consecutive conductor parts form V-parts which are inserted into each other to form an interlaced double layer, said double layers forming outside the soft magnetic body in the direction of the groove width compact winding overhangs.

17. A multiphase electric machine as recited in claim 14 wherein the conductor lanes of different phases form an interlaced double layer of a radial air gap machine and at least two such interlaced double layers constitute a multilayer winding and soft magnetic tooth segments are arranged into said multilayer winding, and wherein the winding has axially stacked contact surfaces.

* * * * *